United States Patent [19]

Hayashi et al.

[11] Patent Number: 5,747,932
[45] Date of Patent: May 5, 1998

[54] PLASMA DISPLAY DEVICE WITH CATHODE INSULATING LAYER

[75] Inventors: Masatake Hayashi; Shigeki Miyazaki, both of Kanagawa, Japan

[73] Assignee: Sony Corporation, Tokyo, Japan

[21] Appl. No.: 644,956

[22] Filed: May 13, 1996

[30] Foreign Application Priority Data

May 12, 1995 [JP] Japan ................................ 7-166766

[51] Int. Cl.$^6$ .................................................... H01J 17/49
[52] U.S. Cl. ........................... 313/582; 313/491; 349/32
[58] Field of Search .............................. 313/582, 583, 313/584, 585, 586, 587, 484, 486, 489, 491, 590; 315/169.4; 349/32

[56] References Cited

U.S. PATENT DOCUMENTS

| | | | |
|---|---|---|---|
| 5,077,553 | 12/1991 | Buzak | 340/794 |
| 5,349,455 | 9/1994 | Hayashi et al. | 313/582 |
| 5,351,144 | 9/1994 | Tanamachi | 313/484 |
| 5,570,104 | 10/1996 | Hayashi | 313/484 |

FOREIGN PATENT DOCUMENTS

| | | | |
|---|---|---|---|
| 0 613 164 | 8/1994 | European Pat. Off. | H01J 9/14 |
| 0 613 165 | 8/1994 | European Pat. Off. | H01J 17/48 |

OTHER PUBLICATIONS

Japanese Abstract, vol. 18, No. 641, JP6251717, Sep. 9, 1994, CL H01J 17/04.
Japanese Abstract, vol. 18, No. 96, JP5297363, Dec. 11, 1993, CL H01J 17/49.
Japanese Abstract, vol. 17, No. 134, JP4306535, Oct. 29, 1992, CL H01J 11/00.

*Primary Examiner*—Michael Horabik
*Assistant Examiner*—Michael Day
*Attorney, Agent, or Firm*—Hill, Steadman & Simpson

[57] ABSTRACT

To suppress the discharge current in a plasma cell incorporated in a display device, thereby extending the useful service life of the plasma cell and stabilizing the operation characteristics of the plasma cell, the display device includes a plasma cell 2, which includes a pair of substrates 3 and 8 bonded together with a space defined therebetween, discharge electrodes 9 and 9a formed on at least the substrate 8, and an ionizable gas sealed in this space. The discharge electrodes 9 and 9a are grouped into plural pairs of anodes A and cathodes K parallel to each other, thus forming a plurality of discharge channels 12 extending in lines. At least each cathode K is partially covered with insulators 13 periodically arranged, thereby limiting the effective area of each discharge electrode 9a to suppress the discharge current.

11 Claims, 2 Drawing Sheets

PLASMA DISPLAY DEVICE WITH CATHODE INSULATING LAYER

BACKGROUND OF THE INVENTION

1. Field of the Invention

The present invention relates to a display device employing a plasma cell, and more particularly to the structure of the discharge electrodes formed in the plasma cell.

2. Description of the Related Art

In general, a plasma cell is used in a display device (a display). For example, a plasma display can be configured by the plasma cell itself, and it has conventionally been developed. Recently, study has been pursued also on a plasma addressed liquid crystal display having a layered structure formed by layering a liquid crystal cell and a plasma cell. In the plasma addressed liquid crystal display, the plasma cell is used for line-sequential addressing of the liquid crystal. In general, the plasma cell is composed of a pair of substrates bonded together with a space defined therebetween, discharge electrodes formed on at least one of the substrates, and an ionizable gas sealed in this space. The discharge electrodes are grouped into plural pairs of anodes and cathodes arranged parallel to each other to form plural discharge channels extending in lines.

In the plasma cell, a large discharge current causes easy increase of sputter of an electrode material, resulting in a short useful service life. However, a discharge current allowing stable plasma discharge (glow discharge) is determined by various conditions such as the surface area of discharge electrodes, especially, cathodes, the kind of gas, and the pressure of gas. If the discharge current is lower than a specified value, it is difficult to obtain a stable glow discharge. Accordingly, when the structure of the discharge electrodes or the kind of plasma gas is decided, the amount of the discharge current is resultantly determined. As a result, the useful service life of the plasma cell is also limited, so that there is no room for improvement. In particular, in the case where the discharge electrodes are formed by screen printing or the like, the discharge current can be suppressed by reducing the width of each discharge electrode. However, it is difficult to reduce the electrode width to a certain value or less in considering a manufacturing process. Further, such a reduction in the width may cause breaks or the like in each discharge electrode. Thus, there is a natural limit in the reduction of the width of each discharge electrode. In addition, the reduction in the width of each discharge electrode causes an increase in the electric resistance of each electrode and a resulting voltage drop along the electrode, so that it is then difficult to generate a stable plasma discharge.

In the plasma cell, a plasma discharge is generated between an anode and a cathode that are opposed to each other. Conventionally, the plasma discharge is generated uniformly and continuously over the whole length of the anode and the cathode between the two discharge electrodes. However, this conventional method has a disadvantage in that the discharge current is increased which causes a large voltage drop due to the electric resistance, resulting in discharge non-uniformity. Further, excess metastable atoms are generated in association with the increase in the discharge current. Particularly in the case of use of the plasma cell for line-sequential scanning of the liquid crystal cell as in the plasma addressed display device, each discharge channel functions as a plasma switch. In this case, the generation of excess metastable atoms causes a deterioration in the responsiveness of the plasma switch, resulting in a problem of interference in its operation, for example.

SUMMARY OF THE INVENTION

The following means is provided to solve the above problems in the prior art. The display device according to the present invention is provided with a plasma cell. The plasma cell comprises a pair of substrates bonded together with a space defined therebetween, discharge electrodes formed on at least one of the substrates, and an ionizable gas sealed in this space. The discharge electrodes are grouped into a plurality of pairs of anodes and cathodes arranged parallel to each other, thus forming a plurality of discharge channels extending in lines. A characteristic structure of the invention is that at least each cathode is partially covered with periodically arranged insulators to thereby limit the effective discharge area of each discharge electrode and suppress the discharge current. In a preferred embodiment of the present invention, both the cathode and the anode in each pair are partially covered with the periodically arranged insulators, and the spatial phase of the periodic arrangement of the insulators on the cathode and the spatial phase of the periodic arrangement of the insulators on the anode are shifted from each other. With this arrangement, an oblique discharge can be achieved. In another preferred embodiment of the present invention, a partition wall for separating the adjacent discharge channels is formed on each anode so as to extend therealong. In this case, each cathode is located between the adjacent partition walls, and is partially covered with the periodically arranged insulators. In an application of the present invention, the display device further includes a liquid crystal cell laid over the plasma cell. The liquid crystal cell has signal electrodes perpendicular to the discharge channels and a liquid crystal interposed between the discharge channels and the signal electrodes. In this case, the period W of the periodically arranged insulators is set so as to establish W=(n+⅓)P or W=(n+⅔) P (where n is 0 or positive integer) in relation to the pitch P of a set of three signal electrodes (RGB trio) to which the three primary colors are allocated.

According to the present invention, in each discharge channel consisting of a pair of an anode and a cathode parallel to each other, at least the cathode is partially covered with the periodically arranged insulators. With this arrangement, the effective area (dischargeable portions) of the discharge electrodes can be limited to thereby generate a suitable amount of charged particles and metastable atoms with a reduced discharge current. In particular, by zigzag arranging the dischargeable portions so that they are not opposed to each other between the anode and the cathode in each pair, the charged particles and the metastable atoms generated by plasma discharge can be uniformly diffused.

DETAILED DESCRIPTION OF THE PREFERRED EMBODIMENTS

Figure 1A:
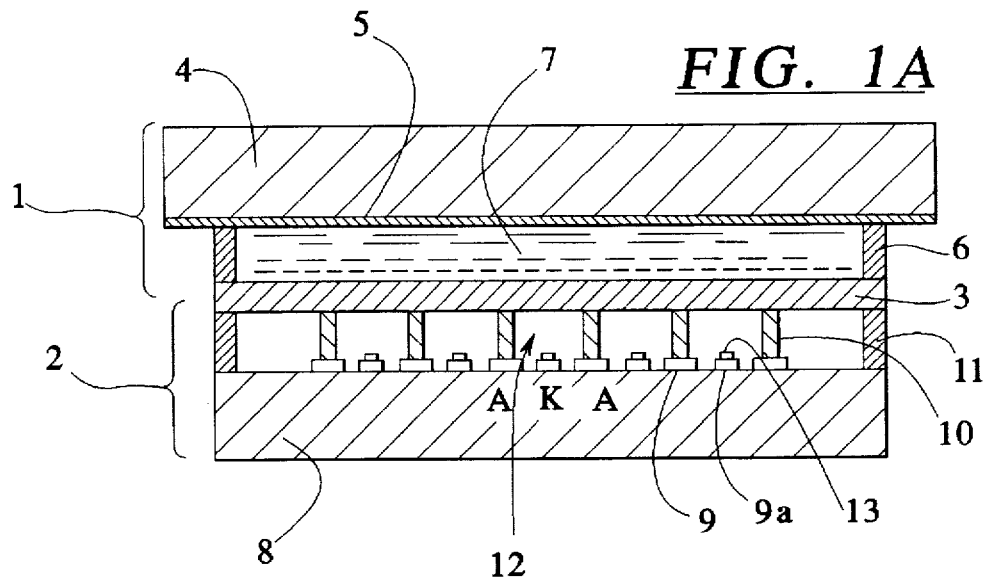
FIGS. 1(A) and 1(B) are a sectional view of a display device and a plan view of an essential part of the display device according to a first preferred embodiment of the present invention, respectively.
Figure 1B:
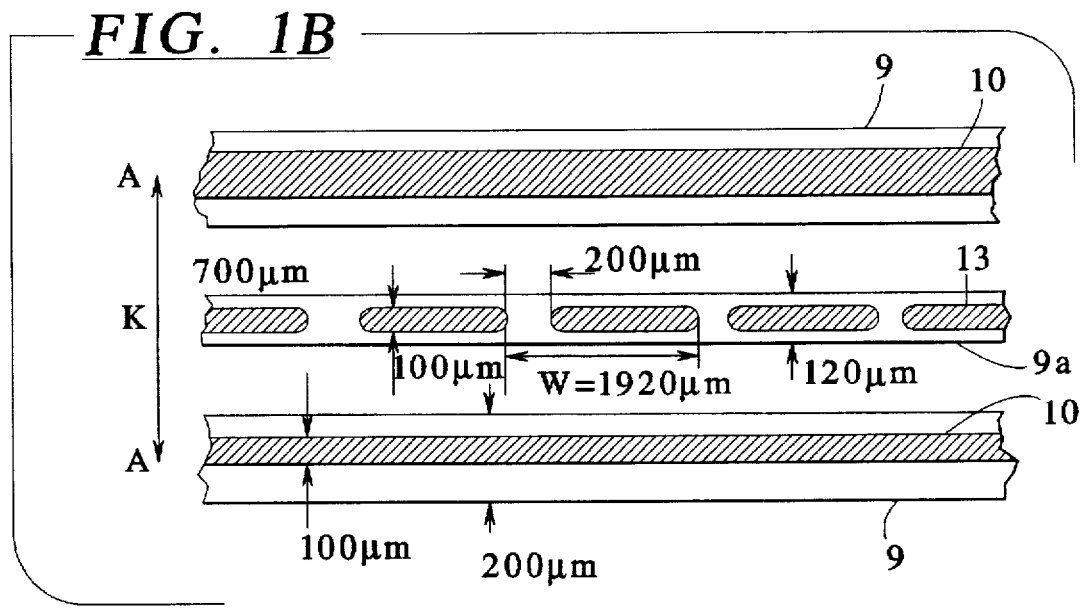

There will now be described in detail some preferred embodiments of the present invention with reference to the drawings. FIG. 1 shows a first preferred embodiment of a display device according to the present invention, in which FIG. 1(A) is a sectional view illustrating the general configuration of the display device, and FIG. 1(B) is a plan view of an essential part of the display device. As shown in FIG. 1(A), the display device in this preferred embodiment is a plasma addressed liquid crystal display employing a plasma cell for line-sequential addressing of a liquid crystal cell. However, the present invention is not limited to this display, but may be of course applied to a plasma display employing a plasma cell solely. As shown in FIG. 1 (A), the display device in this preferred embodiment has a flat panel structure formed by layering a liquid crystal cell 1, a plasma cell 2, and an intermediate substrate 3 of thin-plate glass interposed between the liquid crystal cell 1 and the plasma cell 2. The liquid crystal cell 1 is configured by using an upper substrate 4 of glass or the like. A plurality of signal electrodes 5 of transparent conductor films are formed on the inside principal surface of the upper substrate 4 so as to extend in parallel to each other along a column direction. In the case of a color display device, a color filter may be mounted on the inside surface of the upper substrate 4 to allocate the three primary colors of red, green and blue (RGB) to the signal electrodes 5. The upper substrate 4 is mounted by a sealing member 6 on the intermediate substrate 3 with a given space defined between the upper substrate 4 and the intermediate substrate 3 by the sealing member 6. A liquid crystal 7 is sealed in this space.

On the other hand, the plasma cell 2 is configured by using a lower substrate 8 of glass or the like. A plurality of discharge electrodes 9 and 9a are formed on the inside principal surface of the lower substrate 8 so as to extend in a row direction at right angles to the signal electrodes 5. The discharge electrodes 9 and 9a generate the plasma discharge. In this preferred embodiment, the discharge electrodes 9 are formed as anodes A and the other discharge electrodes 9a are formed as cathodes K. A plurality of partition walls 10 are correspondingly formed along the discharge electrodes 9 so that each partition wall 10 partially overlaps the corresponding discharge electrode 9. The top of each partition wall 10 is in contact with the intermediate substrate 3 to function as a spacer. The discharge electrodes 9a and 9a and the partition walls 10 may be formed by screen printing, for example. The lower substrate 8 is bonded to the intermediate substrate 3 by using a glass frit 11. Accordingly, a hermetically sealed space is defined between the lower substrate 8 and the intermediate substrate 3. This space is partitioned by the partition walls 10 to form a plurality of separate discharge channels 12. In this hermetically sealed space, an ionizable gas is sealed. The ionizable gas may be selected from, e.g., helium, neon, argon, or a mixed gas thereof.

A characteristic structure of the present invention is that at least each discharge electrode 9a which serves as a cathode is partially covered with insulators 13 periodically arranged, so as to limit the effective area of the discharge electrodes and thereby suppress a discharge current. Like the discharge electrodes, the insulators 13 may also be formed by screen printing, for example. In this preferred embodiment, each partition wall 10 separating the adjacent discharge channels 12 is formed on the upper surface of each anode A. On the other hand, each cathode K is located between the adjacent partition walls 10 and is partially covered with the insulators 13 periodically arranged.

A specific pattern of the discharge electrodes 9 and 9a, the partition walls 10, and the insulators 13 will now be described with reference to FIG. 1(B). Each partition wall 10 is formed by printing on the upper surface of each discharge electrode 9 which serves as an anode A in an overlapping relationship. The width of each discharge electrode 9 is set to 200 μm, and the width of each partition wall 10 is set to 100 μm. The spacing between the adjacent partition walls 10 is set to 700 μm. That is, the separate discharge channels are arranged at a pitch of 700 μm. Accordingly, the display device in this preferred embodiment has a vertical resolution of 700 μm pitch. Each discharge electrode 9a which serves as a cathode K is located between the adjacent partition walls 10. The width of each discharge electrode 9a is set to 120 μm. The insulators 13 are periodically arranged on the upper surface of each discharge electrode 9a. The width of each insulator 13 is set to 100 μm, and the spacing between the adjacent insulators 13 formed on each discharge electrode 9a is set to 200 μm. The pitch W of the insulators 13 that are periodically arranged on each discharge electrode 9a is set to 1920 μm.

In this preferred embodiment, the covering insulators 13 are provided along each cathode K. Accordingly, the surface area of each cathode K is reduced to thereby suppress the discharge current. Further, the electric resistance of each cathode K can be made similar to the case where each cathode K is uncovered. Accordingly, the voltage drop is reduced by an amount corresponding to the suppression of the discharge current to thereby ensure the uniformity of the plasma discharge. Furthermore, the covering insulators 13 are periodically arranged along the row direction. Accordingly, dischargeable portions (discharge points) can be discretely placed to allow a reliable and stable discharge at each point. The pitch W of the insulators 13 that are periodically arranged along the row direction is set equal to a value 8/3 times the RGB trio pitch P of the color filter stripes provided correspondingly to the signal electrodes on the liquid cell side. That is, the value 8/3 times P=720 μm is equal to W=1920 μm. In general, the pitch W of the insulators 13 is so set as to establish $W=(n+\frac{1}{3})P$ or $W=(n+\frac{2}{3})P$ (where n is 0 or a positive integer) in relation to the pitch P of a set of three signal electrodes (a RGB trio) to which the three primary colors are allocated. Accordingly, even if a reduction in transmittance of the glass substrate occurs due to deposition by sputter after long-term discharging, a moire effect between the glass substrate and the color filter stripes is hardly visible. In particular, the mixing of the three primary colors, RGB, can be improved as greatly as possible so as to avoid color non-uniformity.

Figure 2:
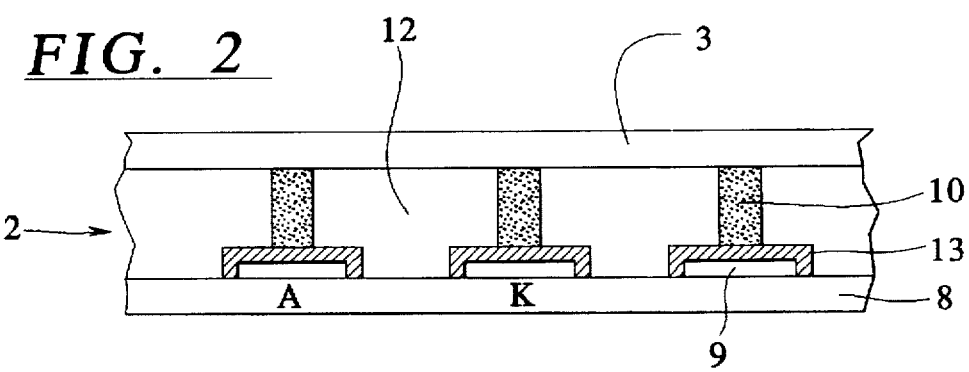
FIG. 2 is a sectional view of an essential part of a display device according to a second preferred embodiment of the present invention.

FIG. 2 is a schematic fragmentary sectional view showing a second preferred embodiment of the display device according to the present invention. Also in this preferred embodiment, the display device is a plasma addressed liquid crystal display incorporating a plasma cell 2, and only the plasma cell 2 as an essential part is shown in FIG. 2 for simplicity of illustration. The structure of the display device in this preferred embodiment is basically similar to that of the first preferred embodiment shown in FIG. 1, and the corresponding parts are denoted by the same reference numerals for easy understanding. In the second preferred embodiment, both the cathodes K and the anodes A are partially covered with insulators 13 periodically arranged. Further, partition walls 10 are formed on both the cathodes K and the anodes A. Accordingly, one side portion of each anode A and one side portion of each cathode K adjacent to this anode A are exposed to each discharge channel 12 defined between the adjacent partition walls 10.

Figure 3:
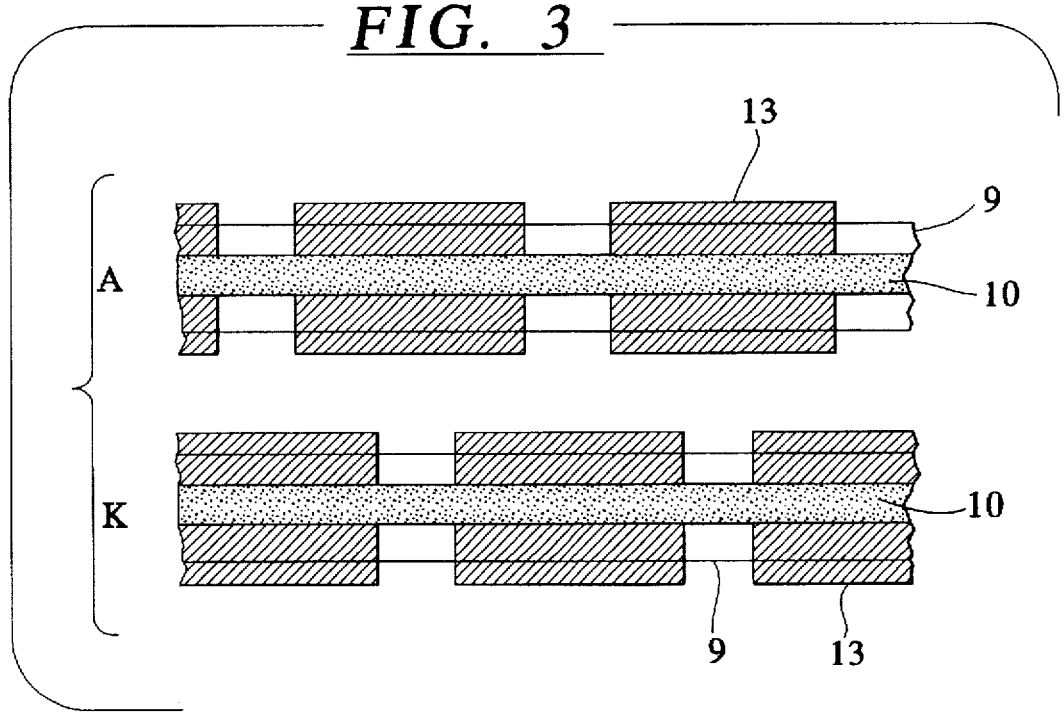
FIG. 3 is a plan view of an essential part of the display device in the second preferred embodiment.

FIG. 3 shows a plan view of the pattern shape of the plasma cell 2 shown in FIG. 2. As apparent from FIG. 3, both the cathode K and the anode A are partially covered with the insulators 13 of dielectric periodically arranged.

Furthermore, the spatial phase of the periodic arrangement of the insulators 13 on the cathode K and the spatial phase of the periodic arrangement of the insulators 13 on the anode A are shifted from each other to provide an oblique discharge structure.

Figure 4A:
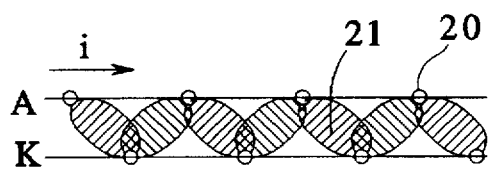
FIGS. 4(A), 4(B), and 4(C) are schematic plan views for illustrating the operation of the second preferred embodiment.
Figure 4B:
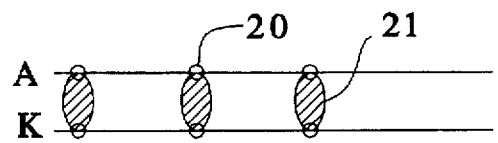
Figure 4C:
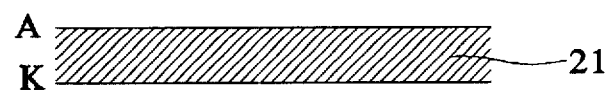

The operation of the second preferred embodiment shown in FIGS. 2 and 3 will now be described in detail with reference to FIGS. 4A to 4C. FIG. 4(A) corresponds to the second preferred embodiment, and FIG. 4(B) shows a comparison. This comparison is also included in the present invention. FIG. 4(C) shows the prior art. In the prior art shown in FIG. 4(C), a discharge region 21 is generated continuously and uniformly between the anode A and the cathode K. In contrast, in the plasma addressed display device according to the present invention as schematically shown in FIG. 4(A), dischargeable portions 20 of the opposed discharge electrodes (the anode A and the cathode K) are limited, and these portions 20 are zigzag arranged between the anode A and the cathode K where they are opposed to each other, thereby effecting an oblique discharge. With this arrangement, a discharge current in every discharge electrode can be reduced as compared with the case where the discharge is carried out over the whole length of each discharge electrode. As a result, ions, electrons, and metastable atoms generated by the discharge can be reduced. In a plasma addressed display device, charged particles and metastable atoms must disappear quickly after finishing the discharge. However, the metastable atoms sometimes exist for a long time such as 20 to 30 µs, and this problem remarkably occurs in the case where the plasma discharge is generated over the whole length of each discharge electrode as shown in FIG. 4(C). The time of disappearance of the metastable atoms finally determines also the operation of writing an image signal to the liquid crystal cell in the plasma addressed display device. Accordingly, the existence of the metastable atoms for a long time of 20 µs causes a problem such that a writing operation cannot be finished during one horizontal period (16.7 µs) in a HDTV, for example, thus interfering with the display quality. Accordingly, it is effective to reduce the metastable atoms by adopting the method shown in FIG. 4(A) or 4(B). However, if the charged particles and the metastable atoms are not uniformly distributed between the opposed discharge electrodes in the operation of the plasma addressed display device, such nonuniform distribution is seen as display non-uniformity. In considering that a small amount of particles are to be distributed as uniformly as possible to avoid the above defect, the zigzag discharge as shown in FIG. 4(A) is preferable as compared with the configuration shown in FIG. 4(B). That is, the configuration shown in FIG. 4(A) is more advantageous because the discharge region 21 can be widened by performing the oblique discharge. The charged particles and the metastable atoms are dispersed widely by diffusion around the discharge region. Thusly, the second preferred embodiment has an advantage that the metastable atoms generated by the discharge can be reduced in number and can be uniformly distributed.

As described above, according to the present invention, at least each cathode is partially covered with the periodically arranged insulators, thereby limiting the effective area of each discharge electrode to suppress a discharge current. Since the discharge current in the display device as a whole can be reduced, the service life of the display device can be extended. Further, since a voltage drop can be reduced, the uniformity of the plasma discharge can be improved to thereby improve the quality and the reliability of the display device. Further, a moire pattern can be prevented by mutually adjusting the pitch of the insulators and the pitch of a set of three signal electrodes to which the three primary colors are allocated. Accordingly, a loss of image quality is not introduced even after longterm use, thus remarkably improving a useful service life. As described above, according to the present invention, the discharge current can be markedly suppressed to thereby reduce a power consumption. Further, discharge non-uniformity caused by a voltage drop due to electric resistance can be reduced. Further, since the metastable atoms quickly disappear, the time of outputting an image signal to the liquid crystal cell can be reduced. In particular, the employment of the oblique discharge allows the charged particles and the metastable atoms generated by plasma discharge to be widely diffused in the discharge channel.

Although other modifications and changes may be suggested by those skilled in the art, it is the intention of the inventors to embody within the patent warranted hereon all changes and modifications as reasonably and properly come within the scope of their contribution to the art.

We claim:

1. A plasma addressed display device having a plasma cell, comprising:

a first substrate and a second substrate applied for forming the plasma cell;

a plurality of plasma electrodes which serve as anode electrodes and cathode electrodes, said plurality of plasma electrodes being provided on said first substrate, pairs of said anode electrodes and said cathode electrodes being provided parallel to each other to form discharge channels; and insulating layers provided on said cathode electrodes to partially cover said cathode electrodes to expose a plurality of discharge locations arranged along a length of each of said cathode electrodes, said insulating layers being free of said second substrate to define a space between said insulating layers and said second substrate.

2. A plasma addressed display device as claimed in claim 1, wherein said cathode electrodes and said anode electrodes are partially covered with said insulating layers along their length, and positions of said insulating layers covering said cathode electrodes and positions of said insulating layers covering said anode electrodes being shifted relative to each other.

3. A plasma addressed display device as claimed in claim 1, wherein each of said anode electrodes have a barrier rib thereon, said barrier rib extending from said anode electrode to said second substrate to define a discharge space.

4. A plasma addressed display device as claimed in claim 3, wherein said discharge electrodes and barrier ribs are formed by printing.

5. A plasma addressed display device as claimed in claim 3, wherein said anode electrodes are free of said insulating layers, said insulating layers being provided only on said cathode electrodes of said discharge electrodes.

6. A plasma addressed display device as claimed in claim 3, wherein said barrier rib is continuous substantially for a length of said anode.

7. A plasma addressed display device as claimed in claim 1, further comprising:

a liquid crystal cell between said second substrate and a third substrate, said liquid crystal cell having signal electrodes which are perpendicular to said discharge electrodes.

8. A plasma addressed display device as claimed in claim 1, wherein said insulating layers are periodically arranged along a length of said cathode electrodes, and a period of arrangement of said insulating layers on said discharge electrodes satisfies the following formula;

$$W=(n+1/3)P,$$

wherein
- W defines a periodicity of arrangement of said insulating layers;
- n is 0 or a positive integer; and
- P defines a width of one pixel.

9. A plasma addressed display device as claimed in claim 1, wherein said insulating layers are periodically arranged along the length of the cathode electrodes, and a period of arranging said insulating layers on said discharge electrodes satisfies the following formula;

$$W=(n+2/3)P,$$

wherein
- W defines a periodicity of arrangement of said insulating layers;
- n is 0 or a positive integer; and
- P defines a width of one pixel.

10. A plasma addressed display device as claimed in claim 1, wherein said insulating layers are of a width less than a width of said plasma electrodes.

11. A plasma addressed display device as claimed in claim 1, wherein said insulating layers covering a top surface of said discharge electrodes at spaced locations, said top surface being opposite said first substrate and facing said second substrate, said insulating layers extending over sides of said discharge electrodes at spaced locations.

* * * * *